US012779492B2

(12) United States Patent
Scott, Sr.

(10) Patent No.: US 12,779,492 B2
(45) Date of Patent: Nov. 3, 2026

(54) FLOW-ON ROLLER COATING SYSTEM

(71) Applicant: The Wooster Brush Company, Wooster, OH (US)

(72) Inventor: John L. Scott, Sr., Wooster, OH (US)

(73) Assignee: The Wooster Brush Company, Wooster, OH (US)

( * ) Notice: Subject to any disclaimer, the term of this patent is extended or adjusted under 35 U.S.C. 154(b) by 365 days.

(21) Appl. No.: 18/610,399

(22) Filed: Mar. 20, 2024

(65) Prior Publication Data

US 2024/0390930 A1 Nov. 28, 2024

Related U.S. Application Data

(60) Provisional application No. 63/504,062, filed on May 24, 2023.

(51) Int. Cl.
*B05C 1/08* (2006.01)
*B05C 1/12* (2006.01)

(52) U.S. Cl.
CPC .............. *B05C 1/0813* (2013.01); *B05C 1/12* (2013.01)

(58) Field of Classification Search
None
See application file for complete search history.

(56) References Cited

U.S. PATENT DOCUMENTS 2,563,842 A * 8/1951 Johnson .............. B05C 17/0357 118/259
2,820,978 A * 1/1958 William .............. B05C 17/0355 401/218
3,049,746 A * 8/1962 Rachal ................ B05C 17/0357 401/219
3,135,005 A * 6/1964 Karkut ................ B05C 17/0333 401/218
3,135,006 A * 6/1964 Leland ................ B05C 17/0357 118/259
3,263,264 A * 8/1966 Leland ................ B05C 17/0357 401/219
3,622,246 A * 11/1971 Grooms .............. B05C 17/0357 401/219

(Continued)

OTHER PUBLICATIONS

Office Action issued for corresponding Canadian application No. 3,234,596, mailed Jul. 14, 2025.

*Primary Examiner* — Emmanuel S Luk
(74) *Attorney, Agent, or Firm* — Renner, Otto, Boisselle & Sklar, LLP

(57) ABSTRACT

A flow-on roller coating system includes a roller frame, a roller rotatably supported by the frame, and a depositor operatively coupled to the frame. The depositor is configured to receive a supply of coating and deposit the coating onto an exterior surface of the roller. The depositor may include an engagement portion having a contact region in direct contact against the exterior surface of the roller, and one or more outlet openings in the engagement portion are located within a perimeter of the contact region. The outlets are configured to discharge coating onto the exterior surface of the roller, which is penetrated into the roller. The depositor may include an intake chamber and a discharge chamber which are separated by a one-way valve. The one-way valve may help to meter the amount of coating discharged from the depositor body, which can help to reduce excess coating flow to reduce drippage.

19 Claims, 9 Drawing Sheets

(56) References Cited

U.S. PATENT DOCUMENTS

| | | | | | |
|---|---|---|---|---|---|
| 3,850,532 | A * | 11/1974 | Kaiser | B05C 17/0357 | 401/15 |
| 4,150,904 | A * | 4/1979 | Stewart | B05C 17/0217 | 401/6 |
| 4,422,789 | A * | 12/1983 | Charney | B05C 17/0333 | 401/218 |
| 4,555,195 | A * | 11/1985 | deVreeze | B05C 17/035 | 401/218 |
| 4,765,353 | A * | 8/1988 | Rhoades | B05C 17/0222 | 68/213 |
| 5,308,182 | A * | 5/1994 | Lampert | B05C 17/0357 | 401/281 |
| 6,190,077 | B1 * | 2/2001 | Newson | B05C 17/0212 | 401/209 |
| 8,230,804 | B1 * | 7/2012 | Barbieri | B05C 1/025 | 118/224 |
| 8,757,914 | B1 * | 6/2014 | Megaro | A45D 34/041 | 401/218 |
| 8,795,785 | B2 | 8/2014 | Rebstock | | |
| 2006/0045981 | A1 * | 3/2006 | Tsushi | B05C 17/0308 | 427/428.01 |
| 2013/0056020 | A1 * | 3/2013 | Wilson | A45D 34/041 | 132/320 |
| 2015/0296957 | A1 * | 10/2015 | Megaro | A45D 34/041 | 401/145 |
| 2017/0341104 | A1 * | 11/2017 | Johnston | B05C 17/0357 | |
| 2021/0205838 | A1 * | 7/2021 | Gavriely | A45D 34/04 | |

* cited by examiner

FLOW-ON ROLLER COATING SYSTEM

PRIORITY INFORMATION

This application claims the benefit of priority to U.S. 63/504,062, filed May 24, 2023, which is hereby incorporated herein by reference in its entirety.

TECHNICAL FIELD

The present invention relates generally to roller coating systems, and more particularly to a flow-on roller coating system.

BACKGROUND

A coating roller is a type of tool used in a variety of industrial and commercial applications for applying coatings onto a surface. Coating rollers typically include a roller frame and a roller rotatably supported by the frame. The roller is often dipped or rolled in a tray containing the coating, and the exterior surface of the roller is designed to absorb and distribute the coating material evenly. Coating rollers can be used with a wide range of coating materials, including latex, enamel, varnish, and epoxy, and are commonly used in the painting industry. Coating rollers are often preferred over other methods of applying coatings, such as brushes or sprayers, due to their ease of use, speed, and consistency of application.

SUMMARY

At least one problem with conventional roller coating systems is that it is cumbersome to apply the coating to the roller. For example, the process of dipping and rolling off excess coating from the roller is often messy and may not provide an even distribution of coating on the roller.

At least one aspect according to the present disclosure provides a unique flow-on roller coating system that applies the coating onto the exterior surface of the roller in a manner that can minimizing drippage of the coating while enhancing the even distribution of the coating applied to the roller.

According to at least one aspect, a flow-on roller coating system includes: a roller frame, a roller rotatably supported by the roller frame, and a depositor operatively coupled to the roller frame, the depositor being configured to receive a supply of coating and deposit the coating onto an exterior surface of the roller; wherein the depositor includes an engagement portion having a contact region in direct contact against the exterior surface of the roller, and wherein the depositor includes one or more discharge outlets in the engagement portion that are located within a perimeter of the contact region and are configured to discharge coating through the one or more discharge outlets and onto the exterior surface of the roller.

Such a roller coating system providing direct contact with the roller can minimize a gap between the depositor discharge section and the exterior of the roller, which can help to reduce excess coating flow and reduce drippage. Such a roller coating system with direct contact also can provide improved penetration and/or distribution of coating applied to the roller, which also can help to reduce drippage and/or improve an even-distribution of coating coverage applied to the roller.

In exemplary embodiments, the depositor includes a single discharge chamber that extends across the entire length of the roller and is in fluid communication with the discharge outlets, which can further enhance the even distribution of coating applied to the roller.

According to another aspect, a flow-on roller coating system includes: a roller frame, a roller rotatably supported by the roller frame, and a depositor operatively coupled to the frame, the depositor including an intake chamber, a discharge chamber, and a one-way valve separating the intake chamber from the discharge chamber, the one-way valve being configured to open and close a flow path of coating from the intake chamber to the discharge chamber.

Such a depositor for a roller coating system that provides a one-way valve in the depositor body can help to meter the amount of coating discharged from the depositor body, which can help to reduce excess coating flow to reduce drippage.

For example, when pressurized pumping action of the coating is ceased, the discharge side of the depositor may be at atmospheric pressure and the one-way valve is configured to self-close in this state. The remaining coating contained in the discharge side of the depositor body can still flow through the discharge outlets in the non-pumping state, and thus the self-closing one-way valve can help to limit the amount of coating discharged through the outlets to only that amount of coating contained on the outlet side of the valve.

In exemplary embodiments, the volume of the discharge chamber at the outlet side of the valve is smaller than the volume of the intake chamber at the inlet side of the valve, which can further help to reduce the amount of coating available to discharge after pumping action has ceased.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

Figure 1:
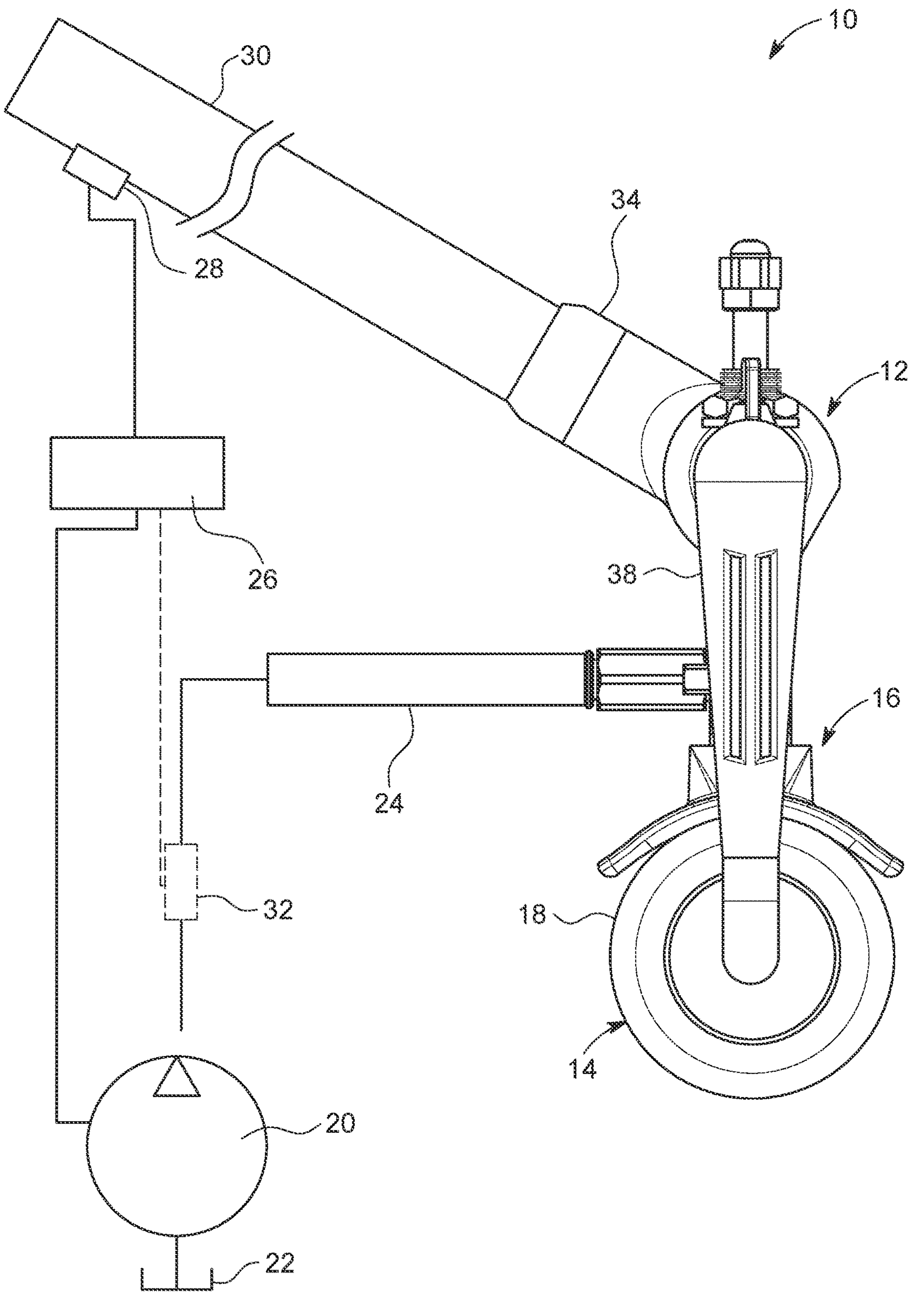
FIG. 1 is a side view of an exemplary roller coating system according to an embodiment of the present disclosure.

Referring to FIGS. 1-8, an exemplary roller coating system 10 according to an embodiment of the present disclosure is shown. The roller coating system 10 generally includes a roller frame 12, a roller 14 rotatably supported by the roller frame 12, and a depositor 16 that is configured to deposit a coating directly onto an exterior surface 18 of the roller 14.

As shown in the illustrated embodiment, particularly with reference to FIG. 1, the roller coating system 10 may include a suitable pump 20 that receives the coating from a reservoir 22, such as a paint container or the like, and then pumps the coating from the reservoir 22 to the depositor 16 via a suitable fluid flow line 24, such as a flexible conduit or the like. As shown, the pump 20 can be controlled by a controller 26, which may include electronic control circuitry, and which may be operatively coupled to a trigger 28 for selectively activating or deactivating the pump 20. The trigger 28 may be located on a handle 30 of the roller coating system 10 which is operatively coupled to the roller frame 12. Alternatively or additionally, the trigger 28 may be operatively coupled to a suitable valve 32, which may either be manually or electronically actuated by activation of the trigger 28, and which can selectively open or close the flow path of the fluid flow line 24 to the depositor 16. In exemplary embodiment(s), the pump may be set to a relatively low pressure such as less than 300 psi, for example in a range from 10 psi to 250 psi, or other suitable pressure to open the one-way valve at crack pressure based on pressure losses and the like.

Figure 2:
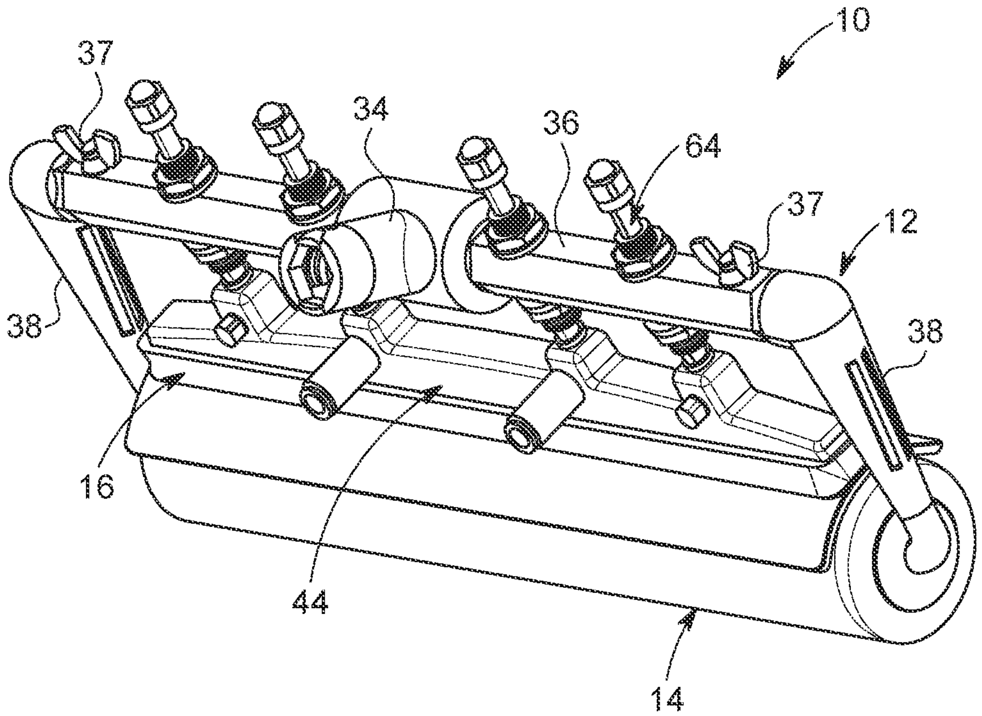
FIG. 2 is a top, rear perspective view of the roller coating system shown in FIG. 1.
Figure 3:
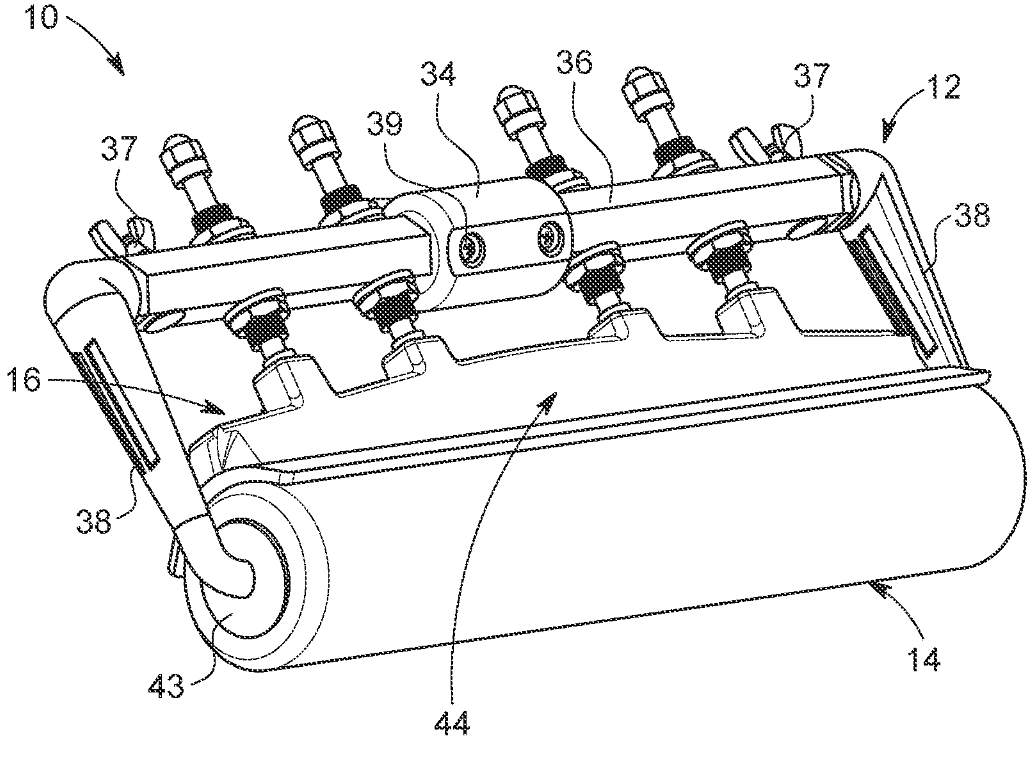
FIG. 3 is a bottom, front perspective view of the roller coating system shown in FIG. 1.
Figure 4:
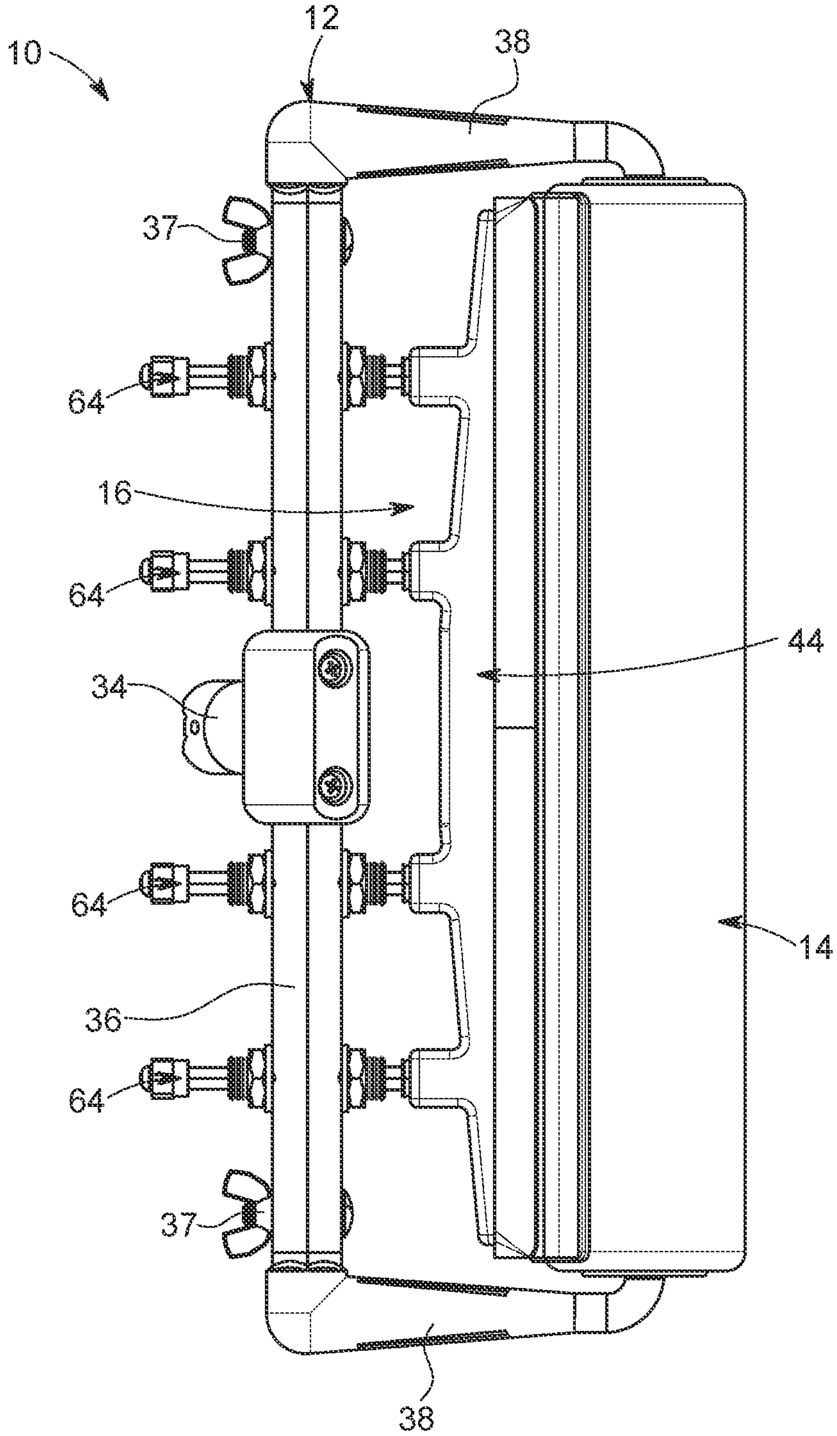
FIG. 4 is a front view of the roller coating system shown in FIG. 1.

Turning particularly to FIGS. 2-4, the frame 12 may have any suitable construction and may be made from any suitable material or combination of materials for supporting the roller 14. As shown, the frame 12 may be operatively coupled to the handle 30 with a connector 34. The handle 30 may be an elongated pole or a shorter handle with a grip, for example. In the illustrated embodiment, the handle 30 is an elongated pole with a threaded end that may be threadedly received in the connector 34. The connector 34 is coupled to a crossbar or crossmember 36 of the frame 12, and one or more support arms 38 may extend from the crossmember 36 to rotatably support the roller 14. The arms 38 may be fixed in position relative to the crossmember 36 via suitable fasteners 37. The angle of the connector 34 relative to the crossmember 36, and thus the arms 38, may be adjustable, such as by tightening or loosening the connector 34 onto the crossmember 36. In the illustrated embodiment, the crossmember 36 is formed as a tube with flats that can engage with fasteners 39 that permit fixing or adjusting the connector 34. Alternatively or additionally, the arms 38 may be adjustable relative to the crossmember 36 such as by tightening or loosening the fasteners 37.

Figure 5:
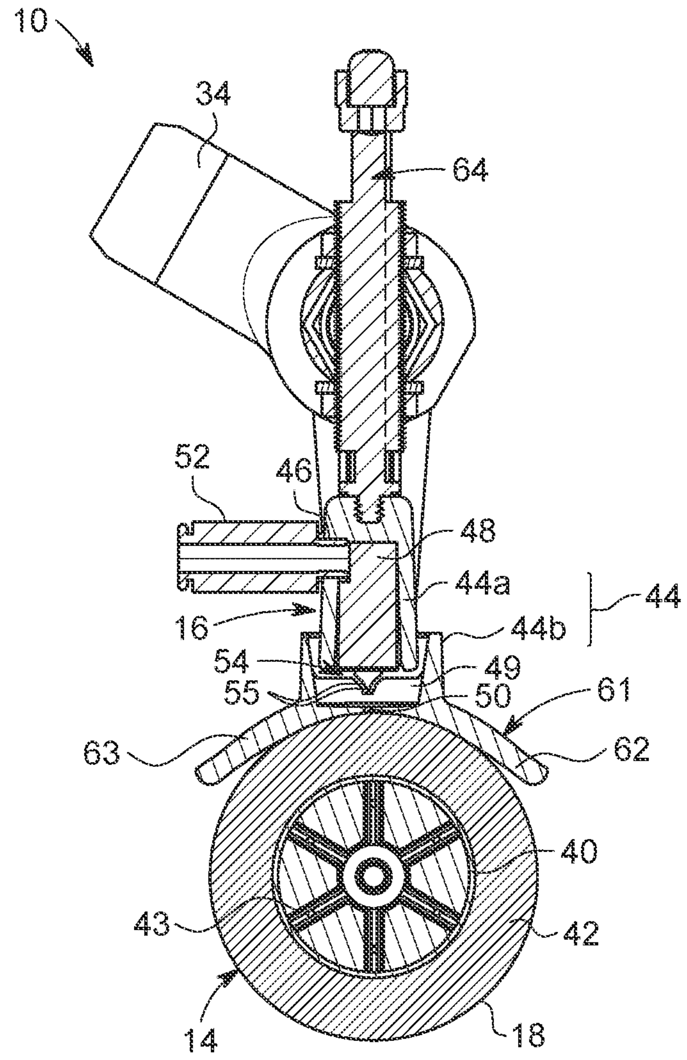
FIG. 5 is a cross-sectional side view of the roller coating system shown in FIG. 1.

Referring particularly to the cross-sectional view of FIG. 5, the roller 14 may include a roller cover (also 14) of any suitable type. The roller cover 14 may include a hollow tubular core 40 to which a suitable outer covering 42 is suitably secured. The core 40 may be made of any suitable crystalline or semi-crystalline polyolefin polymer, such as natural and filled polypropylene and high-density polyethylene, for example. The outer covering 42 forms the exterior surface 18 and may be a conventional roller fabric having, for example, a heavy open weave thermoplastic backing woven into the fabric to allow for a superior mechanical bond between the fabric backing and a bonding film used to adhere the outer covering to the core. The fabric pile or nap of the outer covering 42 may be made of different materials or blends, and may have different lengths or different heights depending on the particular application. Because the roller coating system 10 is a flow-on system, instead of a flow-through system, the outer covering 42 and/or the core 40 are preferably devoid of through-flow openings or perforations that may impair the integrity of the fabric of the roller 14 or increase roller costs. The roller 14 may be rotatably supported by the arms 38 of the frame 12 via any suitable structure, such as via suitable supports 43 (e.g., hubs) rotatably coupled to the arms 38 and which extend into the hollow core of the roller 14; or via a roller cage, rotatable axle, or other suitable structure that extends through the hollow core of the roller 14.

The depositor 16 may be operatively coupled to the roller frame 12 in any suitable manner, such as being operatively coupled to the crossmember 36, one or more of the arms 38, or being integrated (e.g., unitarily molded) with one or more of such component(s) of the frame 12. In the illustrated embodiment, the depositor 16 includes a depositor body 44 that is discrete with respect to the crossmember 36 and support arms 38, and is connected to the crossmember 36 within a span between the support arms 38. The depositor body 44 may be formed by one or more parts, or may be a single unitary body. As shown, the depositor body 44 may be elongated across an entire length of the exterior surface 18 of the roller 14 to deposit coating thereon. Alternatively, the depositor 16 may include multiple bodies, such as multiple modular bodies, that each may deposit coating onto the exterior surface 18 of the roller 14.

Referring particularly to FIGS. 5-8, the depositor 16 generally may include one or more fluid inlets 46 configured to receive the coating, one or more fluid chambers 48, 49 within the depositor body 44 that are fluidly connected to the inlet(s) 46 for receiving the coating and which are configured to contain an amount of the coating, and one or more discharge outlets 50 fluidly connected to the chamber(s) 48, 49 for receiving the coating therefrom and which are configured to dispense the coating onto the exterior surface 18 of the roller 14, which is then penetrated into the roller fabric.

The fluid inlet(s) 46 may include openings or ports in the depositor body 44, which may include fluid connectors 52 coupled thereto. The fluid connectors 52 may be configured to connect to the fluid lines 24 coupled to the pump 20 and reservoir 22 for feeding the coating through the inlets 46 and into the chamber(s) 48, 49 in the depositor body 44. The fluid connectors 52 may be of any suitable form, and in the illustrated embodiment are push-to-connect type connectors that are configured to sealingly connect to flexible tubing. As shown, more than one fluid inlet 46 and associated connector 52 may be provided, which may be coupled to the pump 20 via a branch-line. Alternatively, one of the fluid inlets 46 may be plugged and reserved for later usage. When multiple fluid inlets 46 are used, the depositor body 44 may serve as a manifold body that receives multiple fluid inputs and distributes the flow downstream to the discharge outlets 50 for depositing onto the roller 14.

As shown, the one or more fluid chambers 48, 49 of the depositor 16 may at least partially be formed by internal surfaces of the depositor body 44. In exemplary embodiments, the depositor 16 includes at least one intake chamber 48 and at least one discharge chamber 49 which are separated by at least one one-way valve 54. In the illustrated embodiment, there is only one intake chamber 48 that is elongated along the length of the depositor body 44 and forms a single volume for containing coating that has been received by the depositor 16. Likewise, in the illustrated embodiment, there is only a single one-way valve 54 elongated along the length of the body 44, and a single elongated discharge chamber 49 for containing a portion of the coating that has passed through the one-way valve 54 for being discharged through the discharge outlets 50.

The one-way valve 54 may be any suitable type of valve that allows the coating to flow from the intake chamber 48 to the discharge chamber 49, and which prevents coating flow in the reverse direction. The one-way valve 54 is configured with a desired cracking pressure, which is the minimum pressure at the inlet side that is required to open the valve 54 and allow the coating to flow in the desired direction. In the illustrated embodiment, the one-way valve 54 is configured as an elastomeric valve, such as a lip-seal valve, also referred to as a duckbill valve, which is elongated along the length of the depositor body 44 corresponding with the length of the roller 14. The lip-seal valve 54 has a pair of lips 55 that sealingly engage together when the valve is closed to prevent flow in either direction through the valve. The lips 55 are configured to separate and open the valve 54 at the cracking pressure when fluid pressure in at the inlet side of the valve 54 (e.g., in the intake chamber 48) exceeds the elastomeric biasing force of the lips 55 combined with the fluid pressure at the outlet side of the valve 54 (e.g., in the downstream discharge chamber 49). The one-way lip-seal valve 54 may have a plurality of flow passages 56, such as slits, axially spaced apart along the length of the valve 54 between the lips 55.

As shown in the illustrated embodiment, the depositor body 44 may be a segmented body in which a first (e.g. upper) part 44*a* of the body 44 along with the inlet side of the one-way valve 54 forms the intake chamber 48, and a second (e.g., lower) part 44*b* of the body 44 along with the outlet side of the one-way valve 54 forms the discharge chamber 49. The one-way valve 54 may be secured in place by sandwiching respective parts of the valve 54 between the first and second parts 44*a*, 44*b* of the depositor body 44. This also enables the respective parts of the elastomeric one-way valve 54 to form a seal between the first (e.g., upper) part 44*a* and second (e.g., lower) part 44*b* of the depositor body 44 to seal the respective chambers 48, 49. It is of course understood that the one-way valve 54 could be attached within the depositor body 44 by any other suitable means. It also is understood that the one-way valve 54 can be a valve assembly, for example with the depositor body 44 serving as the valve body and the elastomeric lips 55, or other suitable structure, serving as the valve member for opening or closing flow through the depositor body 44.

In operation, the one-way valve 54 generally is configured to crack open when the pump 20 is triggered to pump the coating into the intake chamber 48, which then exceeds the crack pressure of the valve 54. The coating is forced through the one-way valve 54 by the pumping pressure and is forced through the discharge chamber 49 and through the discharge outlets 50 to deposit onto the exterior surface 18 of the roller 14, which is then penetrated into the roller fabric. As noted above, the one-way valve 54 in the depositor body 44 can help to meter the amount of coating discharged from the depositor body, which can help to reduce excess coating flow to reduce drippage. For example, when pressurized pumping action of the coating by the pump 20 is ceased, the discharge chamber 49 may be at atmospheric pressure and the one-way valve 54 is configured to self-close in this state. The remaining coating contained in the discharge chamber 49 of the depositor body can still flow through the discharge outlets 50 and onto the roller 14 in this non-pumping state, and thus the self-closing one-way valve 54 can help to limit the amount of coating discharged through the outlets 50 to only that amount of coating contained in the discharge chamber 49 on the outlet side of the valve 54.

In exemplary embodiments, the volume of the discharge chamber 49 is smaller than the volume of the intake chamber 48, which can help to meter the amount of coating to be discharged after the one-way valve 54 is closed, for example when the pump 20 is deactivated by releasing the trigger 28. This can help to reduce drippage which may otherwise be caused by excess coating applied to the exterior surface 18 of the roller 14. In the illustrated embodiment, the respective volumes of the intake chamber 48 and discharge chamber 49 are set by the location of the one-way valve 54, although the specific geometries of the chambers 48, 49 also could be modified to set the volumes as desired. As noted above, the discharge chamber 49 may form a single continuous volume that extends across the entire length of the roller and is in fluid communication with the discharge outlets 50, which can further enhance the even distribution of coating applied to the roller 14.

Figure 6:
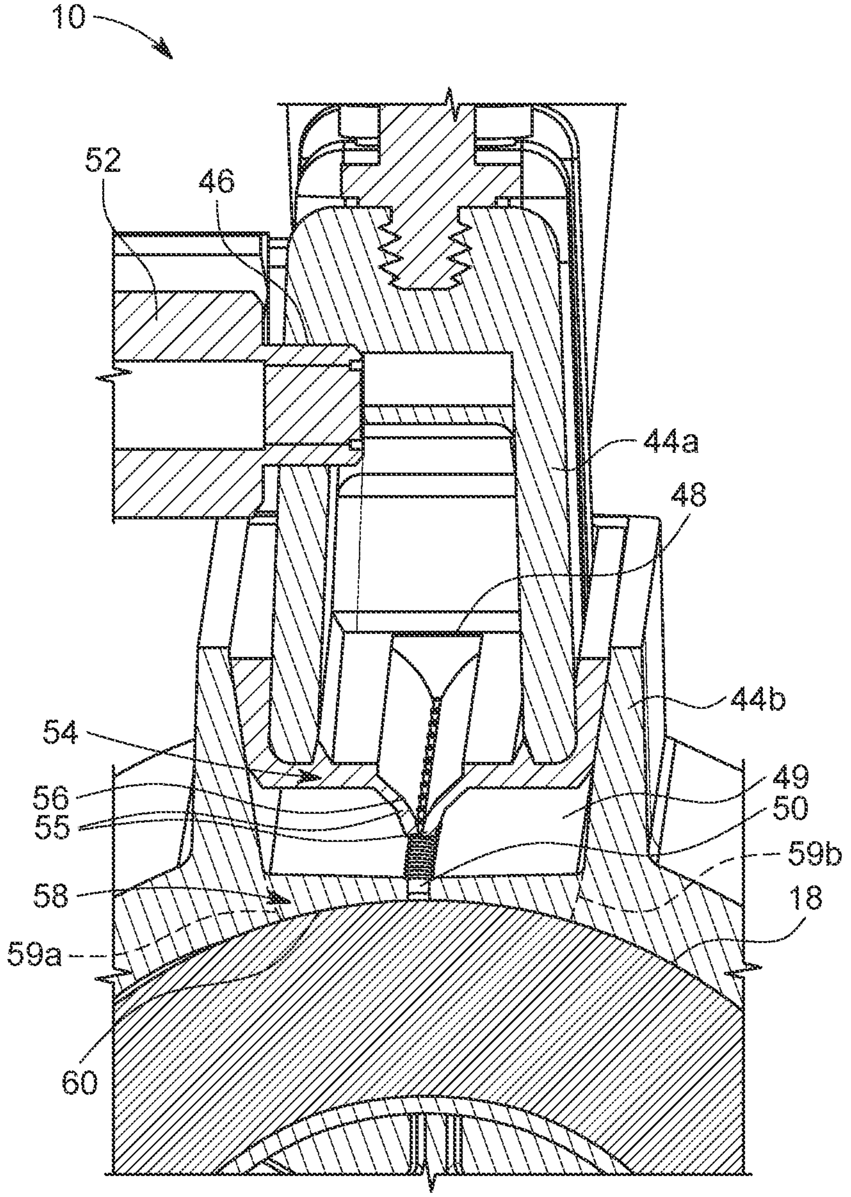
FIG. 6 is an enlarged cross-sectional perspective side view of the roller coating system shown in FIG. 1.
Figure 7:
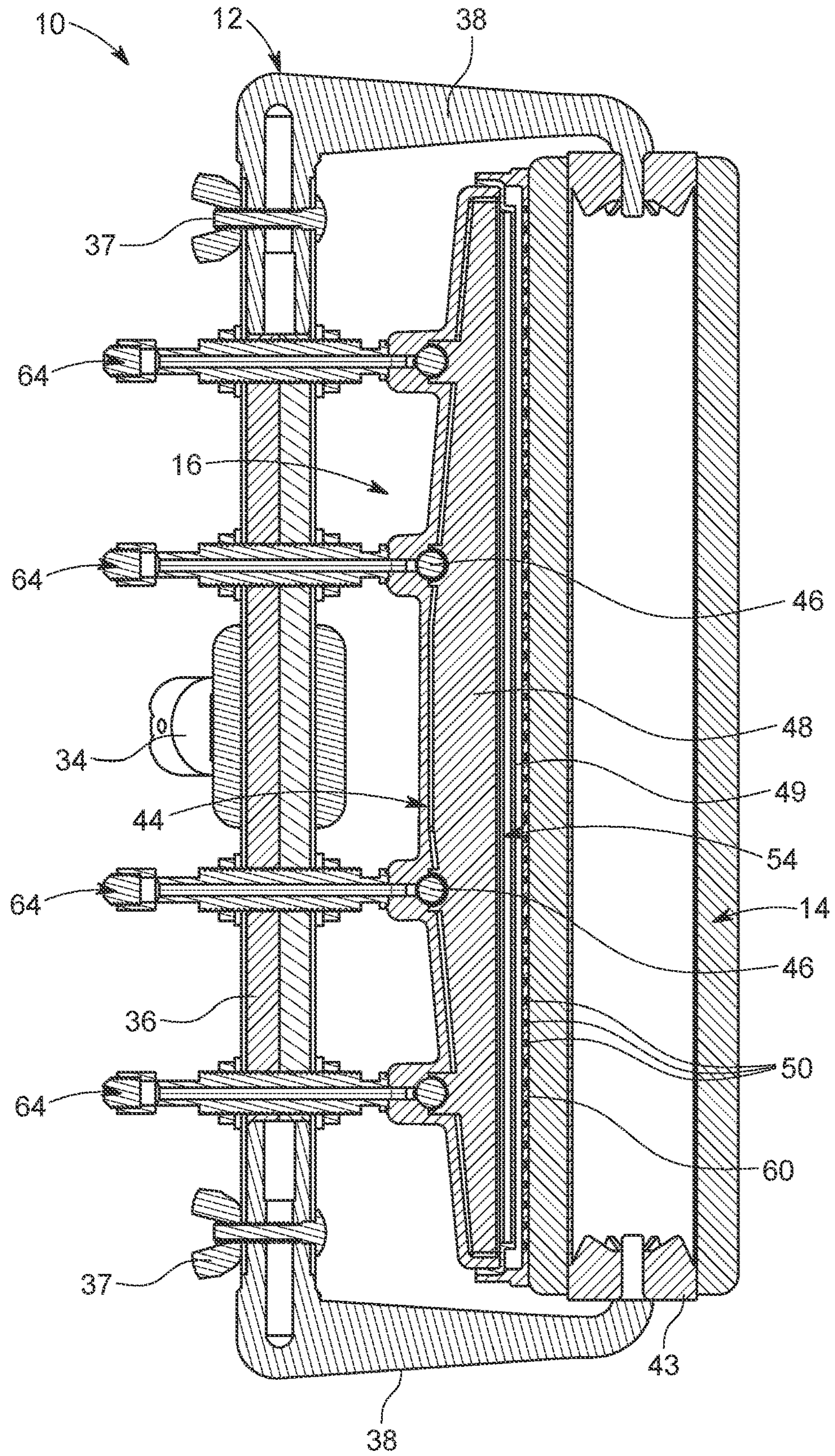
FIG. 7 is a cross-sectional front view of the roller coating system shown in FIG. 1.
Figure 8:
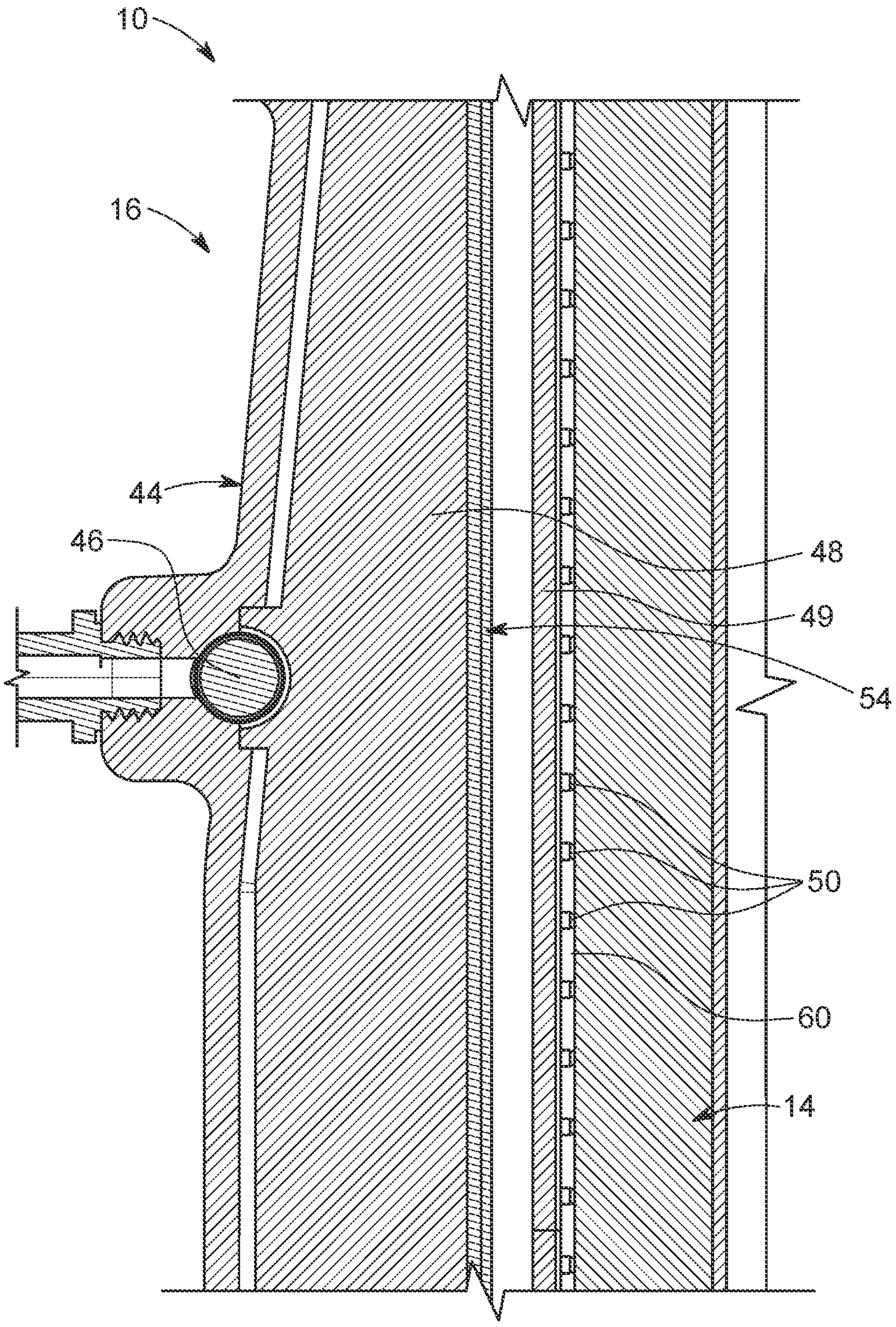
FIG. 8 is an enlarged cross-sectional front view of the roller coating system shown in FIG. 1.

Still referring to FIGS. 5-8, and particularly to the enlarged views of FIGS. 6 and 8, the depositor 16 may include an engagement portion 58 having a contact region (shown between lines 59*a*, 59*b*, and referred to as 59) in direct contact against the exterior surface 18 of the roller 14. The discharge outlets 50 are located within a perimeter of this contact region 59 and are configured to discharge the coating directly onto the exterior surface 18 of the roller 14, which this coating is then penetrated into the roller fabric. As shown in the illustrated embodiment, the contact region 59 of the engagement portion 58 is formed by a single continuous engagement surface 60 that extends across the entire length of the roller exterior surface 18, and engages against the exterior surface 18 of the roller 14. The engagement surface 60 may be curved to correspond to the roller 14 to enhance the contact area of the contact region 59. The discharge outlets 50 are formed as a plurality of spaced part openings that extend through this continuous engagement surface 60. In this manner, the engagement surface 60 bounding and defining the outlet openings 50 is in direct contact with the roller exterior surface 18, such that flow discharged through the openings 50 via the pumping pressure of the pump 20 is penetrated into the fabric of the roller and is evenly spread across the length of the 14 as it rolls across the engagement surface 60.

As is evident in the illustrated embodiment, such a roller coating system 10 in which the depositor 16 makes direct contact with the roller 14 can minimize a gap between the exterior surface 18 of the roller 14 and the depositor discharge section (e.g., outlets 50 or surrounding region), which can help to reduce excess coating flow and reduce drippage. Such a roller coating system 10 with direct contact also can provide improved penetration and/or distribution of coating applied to roller, which also can help to reduce drippage and/or improve an even-distribution of coating coverage applied to the roller. For example, by providing the contact region 59 around the discharge outlet(s) 50, the coating can help to seal around the perimeter of the contact region 59. This can also help to provide a slight backpressure around the outlets 50 during pumping that can aid in the coating penetrating the roller fabric. Meanwhile, the direct contact of the contact region 59 can also help to push and spread the coating across and within the roller fabric.

It is of course understood that the engagement portion 58 of the depositor 16 may have other forms while still providing a contact region 59 that engages directly against the roller 14. For example, instead of the engagement surface 60 bounding and defining the discharge openings 50 as is shown, the contact region 59 of the engagement portion 58 could form one or more peripheral ridges that contact the roller 14, with the discharged outlet(s) 50 being located within these peripheral ridge(s) and being recessed and spaced from the roller exterior surface 18. Such a configuration also could allow the coating to provide a seal at the peripheral ridge(s) which could provide a backpressure in these respective recessed regions within the ridge(s) to improve penetration, while the contact ridge(s) push and spread the coating across and within the roller fabric. However, a single continuous contact region 59 that extends across the entire length of the roller exterior surface 18, such as that shown in the illustrated embodiment, may be beneficial in providing a more even distribution of coating flow.

As shown in the illustrated embodiment, the depositor 16 also may include a shroud 61, which may have a curved leading portion 62 and a curved trailing portion 63. The curvature of the leading portion 62 and curved portion 63 may be such that they help in spreading the coating across the roller surface 18 and minimizing drippage. As shown, the outward ends of the leading and trailing portions 62, 63 of the shroud 61 may diverge away from the roller, which can help with pooling of a bead of coating within the respective trailing and leading gaps, which also can help to distribute coating along the roller length. The shroud 61 may be attached to the depositor body 44, or may be unitary with part of the depositor body 44, such as the lower part of the depositor body 44, as shown.

Referring particularly to FIGS. 4, 5 and 7, the roller coating system 10 may include one or more compensators 64 that are configured to provide a biasing force that biases the engagement portion 58 of the depositor 16 against the roller surface 18. The compensator(s) 64 may include any suitable device that provides the desired biasing force, such as a spring-loaded device (e.g., spring-loaded rod(s) or spring-loaded linear bearing or slide(s)), a bellows, a fluid-operated piston-cylinder device, a flexible or elastomeric member, or the like. In the illustrated embodiment, a plurality of compensators 64 (e.g., four compensators) are mounted on the crossmember 36 in spaced apart relation to provide an even distribution of the biasing load to the roller 14. The illustrated compensators 64 is an assembly including a threaded external cylinder and a telescoping internal piston. The piston is preloaded by a retained compression spring in order to oppose displacement in one direction. The external cylinder is externally threaded in order to be able to adjust the compensator assembly coaxially in order to increase or decrease spring pressure against the roller cover 14. Additionally, the compensator's internal piston is hollow and internally threaded allowing for the potential of coating to flow from the pressure source (e.g., pump 20) through a fitting on the compensator 64, and into the intake chamber 48. It is understood that the compensator(s) 64 could be formed as separate parts, as shown, or could be integrated into the frame 12, depositor 16, or the like. For example, the compensator(s) 64 could also form the inlet(s) to the intake chamber 48 by providing a suitable flow path through the compensator body.

The one or more compensators 64 generally are configured to provide a desired biasing force to facilitate the penetration and distribution of coating as described above, but without so much biasing force that it stalls or impairs the ability to roll the roller 14, or without so much force that it squeezes the coating out of the fabric. In addition, it is beneficial to provide the one or more compensators 64 with a mechanically smooth action to apply a constant pressure between the depositor 16 and the roller 14. In this manner, it may be beneficial to reduce friction of the mechanical sliding action of the compensator(s) 64, such as by using multiple individual linear compensators (as shown), linear bearings, or the like. Because the thickness of the roller 14 may vary due to differences in fabric (e.g., nap height), it also may be beneficial to provide an adjustment feature for the one or more compensators 64. This would permit the engagement surface 60 of the depositor 16 to be moved in relationship to the roller exterior surface 18, thus giving adjustment of contact force with different diameters of roller covers. This may also be a way to control the approach force of the depositor against the cover for different coating viscosities. In the illustrated embodiment, each compensator 64 permits adjustment via threaded engagement with the depositor body 44. Other suitable adjustment mechanisms could also be used, such as a dovetail adjuster, or the like.

In exemplary embodiments, the biasing force may be in a range from 0.5 lb-f to 2.0 lb-f, more particularly from 0.5 to 1.5 lb-f, which may depend on factors such friction resulting from the type of fabric used for the roller (e.g., nap height, etc.) and/or the viscosity of the type of coating to be used. During testing, it has been observed that when the pressure applied to the depositor 16 by the compensator 64 is maintained constantly and equally, the roller 14 acts like a normal tray-loaded roller cover. It has been determined through testing that both the "nap" or pile height of the roller cover as well as the amount of coating in the cover while in use affects the roller's ability to rotate normally on the roller frame with the depositor 16 in contact. For example, a dry roller cover does not turn as well because the coating provides some level of lubrication at the contact points of the depositor 16, and thus keeping a consistent amount of coating loaded into the cover may be advantageous. This is countered by overloading the cover or having unequal or too low of a depositor pressure on the cover, which could promote undesirable dripping.

Figure 9:
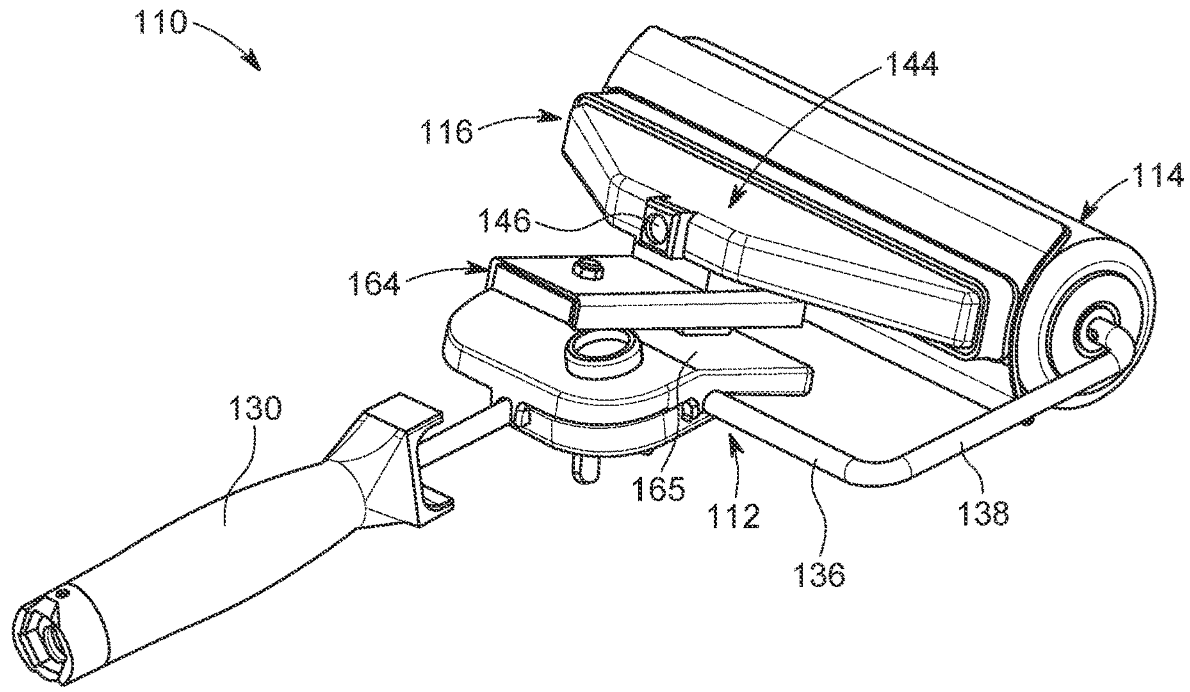
FIG. 9 is a top, rear perspective view of another exemplary roller coating system according to the present disclosure.
Figure 10:
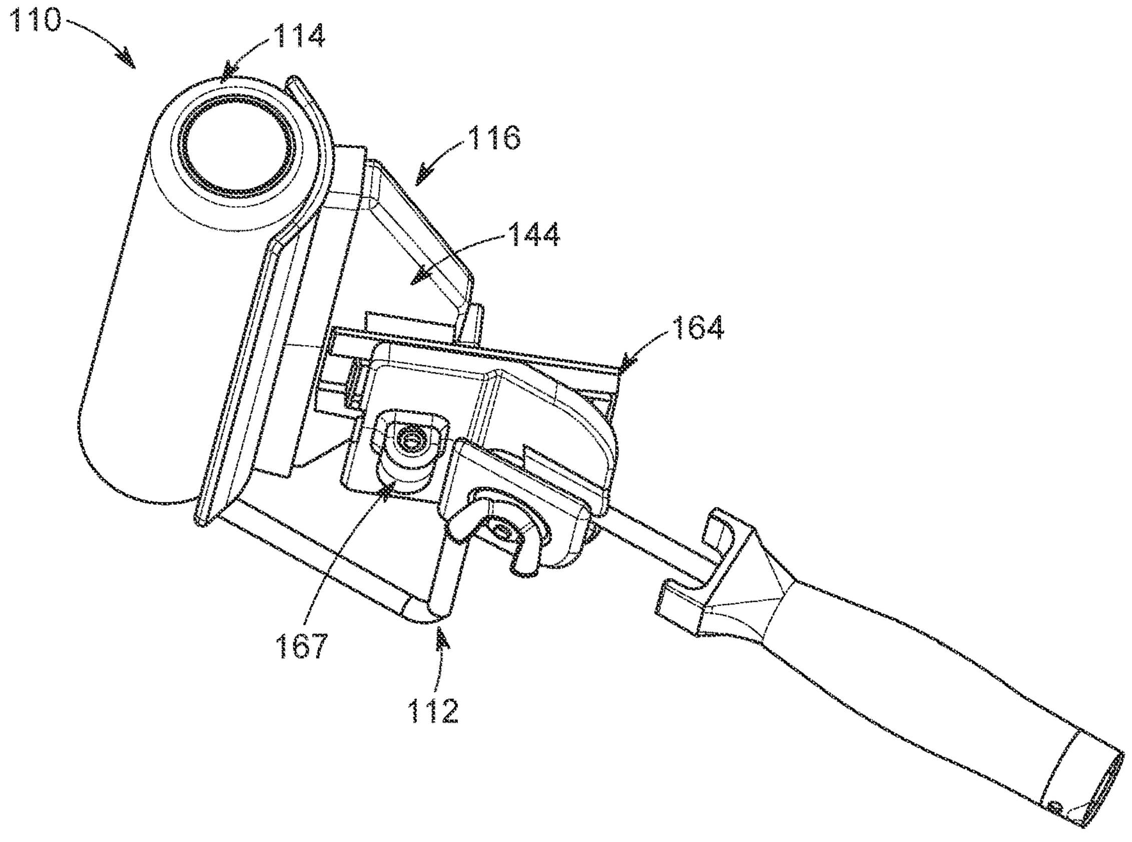
FIG. 10 is a bottom perspective view of the roller coating system shown in FIG. 9.
Figure 11:
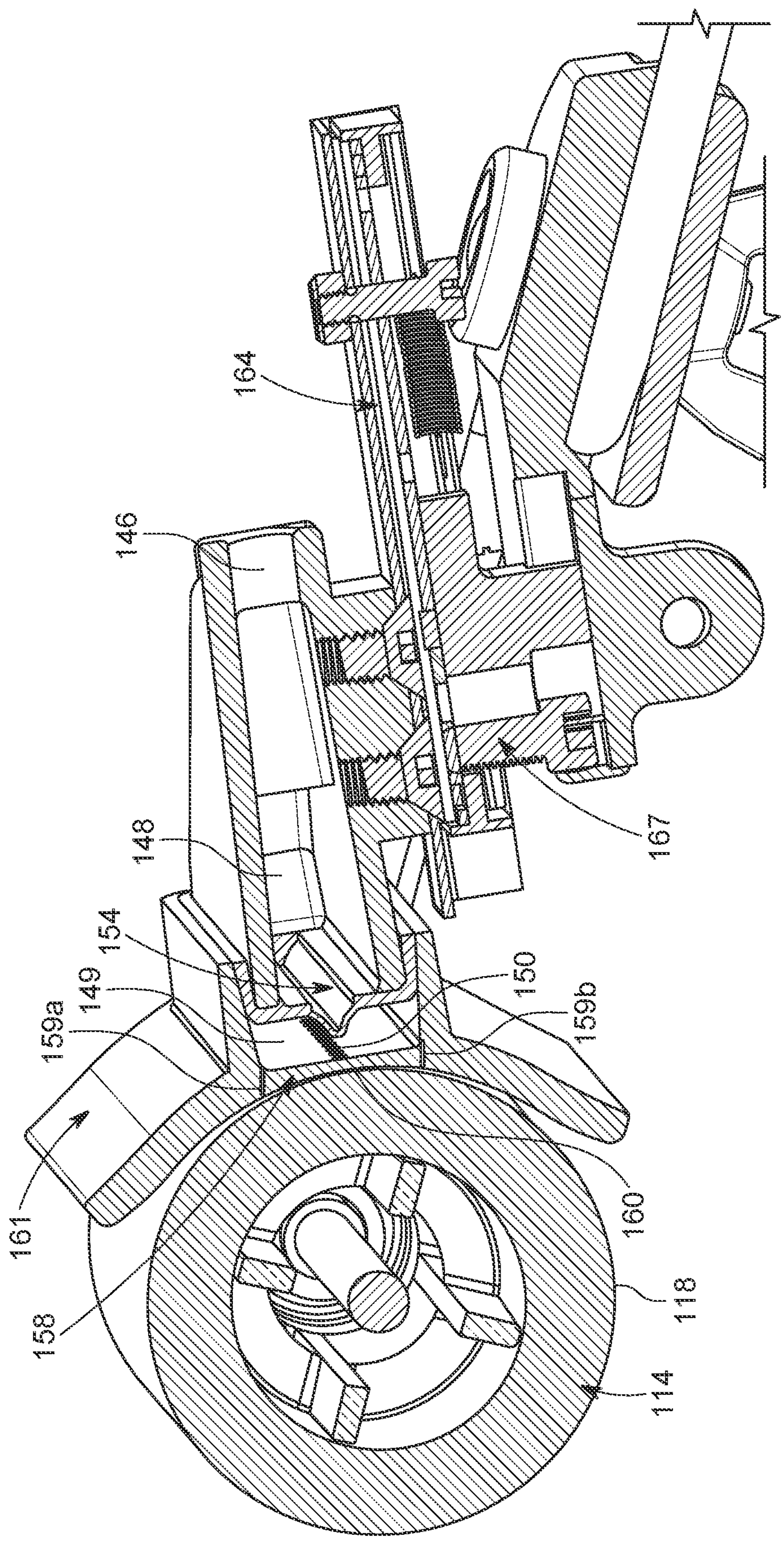
FIG. 11 is an enlarged cross-sectional perspective side view of the roller coating system shown in FIG. 9.

Turning now to FIGS. 9-11, another exemplary embodiment of a roller coating system 110 is shown. The roller coating system 110 is substantially the same as the above-referenced roller coating system 110, and consequently the same reference numerals but indexed by 100 are used to denote structures corresponding to similar structures. In addition, the foregoing description of the roller coating system 10 is equally applicable to the roller coating system 110, except as noted below. It is also understood that aspects of the roller coating systems 10, 110 may be substituted for one another or used in conjunction with one another where applicable.

Similarly to the embodiment of the roller coating system 10, the roller coating system 110 generally includes a roller frame 112, a roller 114 rotatably supported by the roller frame 112, and a depositor 116 that is configured to engage against and deposit a coating directly onto an exterior surface 118 of the roller 116. The depositor 116 includes at least one intake chamber 148 and at least one discharge chamber 149 which are separated by at least one one-way valve 154, which has the same construction as the lip-seal valve 54 described above. The depositor 116 also include one or more fluid inlets 146 configured to fluidly couple to a fluid line connected to a pump for receive the coating into the intake chamber 148, and one or more discharge outlets 150 fluidly connected to the discharge chamber 149 downstream of the one-way valve 154 for discharging the coating onto the exterior surface 118 of the roller 114, which is then penetrated into the roller fabric.

Also similarly to the embodiment of the roller coating system 10, the depositor 116 of the roller coating system 110 may include an engagement portion 158 having a contact region (between 159*a*, 159*b*, and referred to as 159) in direct contact against the exterior surface 118 of the roller 114, in which the discharge outlets 150 are located within a perimeter of this contact region 159. The construction of this engagement portion 158 and contact region 159 is essentially the same as in the roller coating system 10, in which the contact region 159 of the engagement portion 158 is formed by a single continuous engagement surface 160 that extends across the entire length of the roller exterior surface 118, and the discharge outlets 150 are formed as a plurality of spaced part openings that extend through this continuous engagement surface 160. The roller coating system 110 also includes a curved shroud 161, similarly to the roller coating system 10.

The main differences of the roller coating system 110 is in the construction of the frame 112 and the construction of the compensator 164. The location of the fluid inlet 146 in the roller coating system 110 also is different from the roller coating system 10.

As shown, the roller frame 112 is configured with a gripper handle 130, which also may be adapted to receive an elongated arm at its distal end. Instead of a crossmember with opposite arms extending therefrom, the roller frame 112 includes a crossmember 136 with only a single arm 138 that rotatable supports the roller 114.

In the illustrated embodiment, the compensator 164 is mounted to a support 165, which is attached to the crossmember 136. The compensator 164 also is coupled to the depositor body 144. The compensator 164 is in the form of a spring-loaded linear bearing, which in the illustrated embodiment includes an extension spring. The extension spring is found to provide smooth mechanical action and provide an almost constant pressure over the entire (limited) stroke of the linear bearing. For example, the linear stroke may range from 0.375-in. to 0.500-in. The linear bearing reduces the mechanical binding forces and can provide a smooth extension and biasing force to the depositor 116. Because of the difference in the compensator 164 construction, the adjustment mechanism 167 for adjusting the spacing the spring-loaded linear bearing compensator 164 also may be different. The adjustment mechanism 167 can permit the engagement surface 160 of the depositor 116 to be moved in relationship to the roller exterior surface 118, thus giving adjustment of contact force with different diameters of roller covers.

The operation of the roller coating system 110 is essentially the same as in the roller coating system 10, in which the one-way valve 154 is configured to crack open when the pump is triggered to pump the coating into the intake chamber 148, which then exceeds the crack pressure of the valve 154. The coating is forced through the one-way valve 154 by the pumping pressure and is forced through the discharge chamber 149 and through the discharge outlets 150 to deposit onto the exterior surface 118 of the roller 114, which is then penetrated into the roller fabric. As noted above, the one-way valve 154 in the depositor body 144 can help to meter the amount of coating discharged from the depositor body, which can help to reduce excess coating flow to reduce drippage. The direct contact of the depositor 116 against the roller also can provide improved penetration and/or distribution of coating applied to roller, which also can help to reduce drippage and/or improve an even-distribution of coating coverage applied to the roller.

Exemplary flow-on roller coating system(s) have been described herein, which include a roller frame, a roller rotatably supported by the frame, and a depositor operatively coupled to the frame. The depositor is configured to receive a supply of coating and deposit the coating onto an exterior surface of the roller. The depositor may include an engagement portion having a contact region in direct contact against the exterior surface of the roller, and one or more outlet openings in the engagement portion are located within a perimeter of the contact region. The outlets are configured to discharge coating onto the exterior surface of the roller, which is penetrated into the roller. The depositor may include an intake chamber and a discharge chamber which are separated by a one-way valve. The one-way valve may help to meter the amount of coating discharged from the depositor body, which can help to reduce excess coating flow to reduce drippage.

In exemplary embodiments, the flow-on roller coating system provides the ability to roll paint and coatings without the typical use of a roller tray to add coatings to the roller cover. The system also reduces the necessity for perforated roller covers.

In exemplary embodiments, the system is fed from a low-pressure pump drawing material from a bulk container. The system may be adapted to fit various designs of roller frames. The method of depositing the coating provides a source of flow of the coating which may be in constant contact with the roller cover while in use. After a typical "loading" of the cover, the flow source is triggered by the user periodically to maintain a constant load of coating in the roller cover nap.

The system may include a depositor body, which may be in the form of a manifold that receives the coating from a pump system, a self-closing or one-way valve that limits the coating from leaving the manifold at atmospheric pressure, a discharge section, which may be in the form of a depositing shroud, which disperses the coating over the length of the roller cover, and an active spring-loaded mechanism that maintains the depositing system against the roller cover.

The self-closing valve facilitates retention of the coating in the depositor body after pump pressure is released and the body comes to near atmospheric pressure. This valve function further prevents dripping coatings from the depositor. In exemplary embodiments, the valve is designed as an elastomeric orifice that opens under pressure of the coating fluid being applied. The elastomeric material may be an entire distributor cap that separates the intake chamber part of the depositor body, or can be part of an assembly. The downstream part of the depositor may be a single injection molded part that forms a second chamber or reservoir at atmospheric pressure on the outlet side of the valve. The volume of the second reservoir or discharge chamber is released to the roller by a series of discharge outlets which may be in the form of perforations in the discharge section.

The spring-loaded mechanism may either be attached to the roller frame as an accessory or may be an integral component thereof. The spring-loaded mechanism may include one or more compression springs or extension springs. To aid in smooth mechanical motion, the spring-loaded mechanism may include a guide, such as a linear bearing guide.

An adjuster, such as one or more threads, a coarse dovetail adjustor, or the like may be provided to allow the face of the depositor to be moved in relationship to the roller cover thus giving adjustment of contact force with different diameters of roller covers. This may also be a way to control the approach force of the depositor against the cover for different coating viscosities.

According to an aspect, a flow-on roller coating system includes: a roller frame, a roller rotatably supported by the roller frame, and a depositor operatively coupled to the roller frame, the depositor being configured to receive a supply of coating and deposit the coating onto an exterior surface of the roller; wherein the depositor includes an engagement portion having a contact region in direct contact against the exterior surface of the roller, and wherein the depositor includes one or more discharge outlets in the engagement portion that are located within a perimeter of the contact region and are configured to discharge coating through the one or more discharge outlets and onto the exterior surface of the roller.

Exemplary embodiments may include one or more of the following additional features, separately or in any combination.

In exemplary embodiment(s), the contact region includes an engagement surface that engages directly against the exterior surface of the roller.

In exemplary embodiment(s), the one or more discharge outlets include one or more outlet openings that are bounded and defined by the engagement surface.

In exemplary embodiment(s), the engagement surface is a single continuous engagement surface that extends across the entire length of the roller exterior surface.

In exemplary embodiment(s), the engagement surface is curved complimentarily to the exterior surface of the roller.

In exemplary embodiment(s), the one or more discharge outlets include a plurality of spaced part openings along the length of the roller that extend through the engagement surface.

In exemplary embodiment(s), the coating system further including one or more compensators that are configured to provide a biasing force that biases the engagement portion of the depositor against the exterior surface of the roller surface.

In exemplary embodiment(s), the one or more compensators include a plurality of individual compensators that are mounted on the roller frame in spaced apart relation relative to each other.

In exemplary embodiment(s), the depositor includes a depositor body including one or more fluid inlets configured to receive the coating, one or more fluid chambers within the depositor body that are fluidly connected to the one or more fluid inlets for receiving and containing the coating, and the one or more discharge outlets are fluidly connected to the one or more fluid chamber for receiving the coating therefrom.

In exemplary embodiment(s), the one or more fluid chambers includes at least one intake chamber and at least one discharge chamber which are separated by at least one one-way valve.

In exemplary embodiment(s), the depositor includes only a single intake chamber and a single discharge chamber.

In exemplary embodiment(s), the intake chamber and/or the discharge chamber is/are elongated in a direction of the roller axis.

In exemplary embodiment(s), the one-way valve is configured as an elastomeric lip-seal valve.

In exemplary embodiment(s), the one-way valve is a self-closing valve.

In exemplary embodiment(s), only a single one-way valve is provided, which is elongated along the length of the depositor body corresponding with the length of the roller.

In exemplary embodiment(s), the volume of the discharge chamber is smaller than the volume of the intake chamber to reduce the amount of coating contained in the discharge chamber.

According to another aspect, a flow-on roller coating system includes: a roller frame, a roller rotatably supported by the roller frame, and a depositor operatively coupled to the frame, the depositor including an intake chamber, a discharge chamber, and a one-way valve separating the intake chamber from the discharge chamber, wherein the one-way valve is configured to open and close a flow path of coating from the intake chamber to the discharge chamber, and wherein the depositor includes one or more discharge outlets fluidly connected to the discharge chamber, the one or more discharge outlets being configured to discharge coating on an exterior surface of the roller.

Exemplary embodiments may include one or more of the following additional features, separately or in any combination.

In exemplary embodiment(s), the volume of the discharge chamber is smaller than the volume of the intake chamber to reduce the amount of coating contained in the discharge chamber.

In exemplary embodiment(s), the depositor includes a single intake chamber and a single discharge chamber, the intake and discharge chambers being elongated to cover a length of the exterior surface of the roller.

In exemplary embodiment(s), the one-way valve is configured as an elastomeric valve.

In exemplary embodiment(s), only a single one-way valve is provided, which is elongated along the length of the depositor body corresponding with the length of the roller.

In exemplary embodiment(s), the coating system may include any of the foregoing features in any combination.

An "operative connection," or a connection by which entities are "operatively connected," is one in which the entities are connected in such a way that the entities may perform as intended. An operative connection may be a direct connection or an indirect connection in which an intermediate entity or entities cooperate or otherwise are part of the connection or are in between the operatively connected entities. An operative connection or coupling may include the entities being integral and unitary with each other.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

It is to be understood that all ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values. The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The transitional words or phrases, such as "comprising," "including," "carrying," "having," "containing," "involving," "holding," and the like, are to be understood to be open-ended, i.e., to mean including but not limited to.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A flow-on roller coating system comprising:

a roller frame, a roller rotatably supported by the roller frame, and a depositor operatively coupled to the roller frame, the depositor being configured to receive coating from an external source and deposit the coating onto an exterior surface of the roller, wherein the depositor includes;

a depositor body including:

one or more fluid inlets configured to receive the coating from the external source;

at least one intake chamber fluidly connected to the one or more fluid inlets and configured to receive and contain the received coating;

at least one discharge chamber;

at least one one-way valve separating the at least one intake chamber from the at least one discharge chamber and configured to open when pressure of the coating in the at least one intake chamber exceeds a cracking pressure of the at least one one-way valve to allow the coating to pass from the at least one intake chamber into the at least one discharge chamber; and an engagement portion having a contact region in direct contact against the exterior surface of the roller, the engagement portion including one or more discharge outlets located within a perimeter of the contact region and fluidly connected to the at least one discharge chamber to discharge the coating from the at least one discharge chamber onto the exterior surface of the roller.

2. The flow-on roller coating system according to claim 1, wherein the contact region includes an engagement surface that engages directly against the exterior surface of the roller, and wherein the one or more discharge outlets include one or more outlet openings that are bounded and defined by the engagement surface.

3. The flow-on roller coating system according to claim 2, wherein the engagement surface is a single continuous engagement surface that extends across the entire length of the roller exterior surface.

4. The flow-on roller coating system according to claim 2, wherein the engagement surface is curved complimentarily to the exterior surface of the roller.

5. The flow-on roller coating system according to claim 2, wherein the one or more discharge outlets include a plurality of spaced part openings along the length of the roller that extend through the engagement surface.

6. The flow-on roller coating system according to claim 2, further including one or more compensators that are configured to provide a biasing force that biases the engagement portion of the depositor against the exterior surface of the roller surface.

7. The flow-on roller coating system according to claim 6, wherein the one or more compensators include a plurality of individual compensators that are mounted on the roller frame in spaced apart relation relative to each other.

8. The flow-on roller coating system according to claim 6, wherein each of the one or more compensators includes an external cylinder, an internal piston movable relative to the external cylinder, and a compression spring configured to preload the internal piston such that the internal piston provides the biasing force that biases the engagement portion of the depositor against the exterior surface of the roller.

9. The flow-on roller coating system according to claim 8, wherein the external cylinder is threaded to permit coaxial adjustment of the compensator assembly to modulate the biasing force that biases the engagement portion of the depositor against the exterior surface of the roller.

10. The flow-on roller coating system according to claim 1, wherein the depositor includes only a single intake chamber and a single discharge chamber.

11. The flow-on roller coating system according to claim 1, wherein at least one of the intake chamber or the discharge chamber are elongated in a direction of the roller axis.

12. The flow-on roller coating system according to claim 1, wherein the one-way valve is configured as a self-closing elastomeric lip-seal valve.

13. The flow-on roller coating system according to claim 12, wherein only a single one-way valve is provided, which is elongated along the length of the depositor body corresponding with the length of the roller.

14. The flow-on roller coating system according to claim 1, wherein the volume of the discharge chamber is smaller than the volume of the intake chamber to reduce the amount of coating contained in the discharge chamber.

15. A flow-on roller coating system comprising:

a roller frame, a roller rotatably supported by the roller frame, and a depositor operatively coupled to the frame, the depositor including an engagement portion having a contact region in direct contact against the exterior surface of the roller, the depositor further including an intake chamber, a discharge chamber, and a one-way valve separating the intake chamber from the discharge chamber, wherein the one-way valve is configured to open and close a flow path of coating from the intake chamber to the discharge chamber, wherein the contact region includes an engagement surface that engages directly against the exterior surface of the roller, wherein the depositor includes one or more discharge outlets in the engagement portion that are located within a perimeter of the contact region and fluidly connected to the discharge chamber, the one or more discharge outlets including one or more outlet openings that are bounded and defined by the engagement surface and configured to discharge coating onto the exterior surface of the roller, and wherein the flow-on roller coating system further includes one or more compensators that are configured to provide a biasing force that biases the engagement portion of the depositor against the exterior surface of the roller, wherein each of the one or more compensators includes an external cylinder, an internal piston movable relative to the external cylinder, and a compression spring configured to preload the internal piston such that the internal piston provides the biasing force that biases the engagement portion of the depositor against the exterior surface of the roller.

16. The flow-on roller coating system according to claim 15, wherein the volume of the discharge chamber is smaller than the volume of the intake chamber to reduce the amount of coating contained in the discharge chamber.

17. The flow-on roller coating system according to claim 15, wherein the depositor includes a single intake chamber and a single discharge chamber, the intake and discharge chambers being elongated to cover a length of the exterior surface of the roller.

18. The flow-on roller coating system according to claim 15, wherein the one-way valve is configured as an elastomeric valve.

19. The flow-on roller coating system according to claim 15, wherein only a single one-way valve is provided, which is elongated along the length of the depositor body corresponding with the length of the roller.

* * * * *